United States Patent [19]

Coulson et al.

[11] Patent Number: 5,589,288
[45] Date of Patent: Dec. 31, 1996

[54] CORDLESS POWER TOOL HAVING A PUSH BUTTON BATTERY RELEASE ARRANGEMENT

[75] Inventors: Richard R. Coulson, Toronto; Eric D'amario, Woodbridge; Jerry Moscovitch, Toronto, all of Canada

[73] Assignee: Black & Decker, Inc., Newark, Del.

[21] Appl. No.: 509,076

[22] Filed: Jul. 31, 1995

[51] Int. Cl.⁶ ................................................ H01M 2/10
[52] U.S. Cl. .................... 429/96; 429/98; 429/123; 30/500
[58] Field of Search ............................ 429/96, 97, 98, 429/99, 123, 9; 30/500; 292/45, 46, 49, 224, DIG. 38

[56] References Cited

U.S. PATENT DOCUMENTS

| | | |
|---|---|---|
| 2,007,320 | 7/1935 | Young . |
| 3,070,748 | 12/1962 | Worobey et al. . |
| 3,186,878 | 6/1965 | Filander . |
| 3,194,688 | 7/1965 | Riley, Jr. et al. . |
| 3,494,799 | 2/1970 | Pedone, Jr. . |
| 3,505,122 | 4/1970 | Witteveen . |
| 3,525,919 | 8/1970 | Wise . |
| 3,999,110 | 12/1976 | Ramstrom et al. . |
| 4,191,917 | 4/1980 | Brown et al. . |
| 4,389,469 | 6/1983 | Nicholls . |
| 4,399,201 | 8/1983 | Nagahara . |
| 4,429,025 | 1/1984 | Stow . |
| 4,436,792 | 3/1984 | Tomino et al. . |
| 4,751,452 | 6/1988 | Kilmer et al. . |
| 4,842,966 | 6/1989 | Omori et al. . |
| 4,871,629 | 10/1989 | Bunyea . |
| 5,213,913 | 5/1993 | Anthony, III et al. . |
| 5,225,293 | 7/1993 | Mitchell et al. . |
| 5,391,972 | 2/1995 | Gardner et al. . |
| 5,401,592 | 3/1995 | Gilpin et al. ........................ 429/97 |
| 5,460,906 | 10/1995 | Leon et al. .......................... 429/97 |

FOREIGN PATENT DOCUMENTS

| | | |
|---|---|---|
| 971235 | 8/1975 | United Kingdom . |
| 975453 | 12/1976 | United Kingdom . |
| 2003735 | 6/1990 | United Kingdom . |
| 2028260 | 4/1993 | United Kingdom . |

*Primary Examiner*—Anthony Skapars
*Attorney, Agent, or Firm*—Harness, Dickey & Pierce, P.L.C.

[57] ABSTRACT

A battery pack release arrangement for a cordless power tool includes a manually operable actuation member which is movable between a latching position and a release position. In the latching position, a pair of battery packs of the cordless power tool are releasably retained within the tool housing. When the actuation member is moved to the release position, the battery packs are permitted to be quickly and easily removed for recharging. Preferably, the manually operable actuation member is unitarily constructed to include a manual contact push button portion and a latching portion including a pair of latching legs for engaging the battery packs. The latching legs are resiliently deflectable. The battery pack release arrangement of the present invention further includes a guiding member, or camming member, which functions to direct the latching legs of the actuation member out of an normally interfering relation with the battery packs as the actuation member is moved to the release position. The camming member defines a pair of camming surface adapted to cooperatively engage the latching legs. In this regard, the latching legs are deflected by camming surfaces from interfering relation with the battery pack when the actuation member is moved to a release position.

18 Claims, 5 Drawing Sheets

5,589,288

CORDLESS POWER TOOL HAVING A PUSH BUTTON BATTERY RELEASE ARRANGEMENT

BACKGROUND AND SUMMARY

1. Technical Field

The present invention relates in general to cordless power tools. In particular, the present invention relates to a battery release arrangement for a cordless power tool.

2. Discussion

Cordless power tools are used in a wide variety of applications. For example, various cordless vegetation trimming devices are used to trim vegetation such as grass or weeds in areas such as along walls of buildings, fences, around shrubs, and other areas where lawn mowers and other like apparatuses are not able to easily access. Other cordless vegetation trimming devices are used to manicure shrubs, trees and the like. In addition to vegetation trimming devices, cordless power tools include drills, impact wrenches, and the like.

The benefits of battery powered devices over conventional AC powered and gasoline powered devices have long been recognized. For example, batteries generally provide a cleaner and less costly form of power compared to gasoline or other combustible fuels. Also, battery powered engines generally have increased reliability and lower maintenance compared with gasoline engines. Compared with AC powered devices, battery powered devices are not fraught with the disadvantages associated with a power cord, including but not limited to the restricted distance the device can be operated from an electrical outlet. Historically, battery powered devices have been associated with limited operational life between recharging and lower performance. However, modern battery technology has greatly improved battery life and performance, resulting in a corresponding increase in consumer popularity with cordless power tools.

It has been found convenient to have the battery packs of cordless power tools releasably mounted within the housing so that the battery packs can be removed quickly and easily for recharging. During this recharging, the battery packs are placed in a charging unit connected to a source of AC supply. While the battery packs are in place in the cordless power tools, it may be desired to securely latch them in position.

It is known to facilitate the removal of rechargeable battery packs through the incorporation of a release arrangement. Most known battery release mechanisms utilize an independently manufactured biasing spring which operates to normally urge the mechanism to a latched condition. One known release mechanism is shown in U.S. Pat. No. 4,871,629 to Bunyea. This patent is assigned to the assignee of record of the present invention and is expressly incorporated herein by reference.

The battery release mechanism for a cordless power tool disclosed in U.S. Pat. No. 4,871,629 is specifically adapted to cooperate with a battery pack having a casing with a shoulder on its outside surface. The release mechanism includes a spring member having a displaceable limb resiliently biased against the casing. A manually actuatable latch release member is movably mounted in the power tool between a latching position and a release position. The limb normally blocks the shoulder in the latching position to latch the battery pack in the power tool. The release member functions to displace the limb away from the casing and clear of the shoulder in the release position to unlatch the battery pack and allow withdrawal thereof from the power tool. In the embodiment described, the release member comprises a yoke straddling the battery pack.

While prior known devices such as the one discussed above have generally proven to be commercially successful, it is further desirable, however, to provide a battery pack release arrangement for a cordless power tool that does not require a separately manufactured spring member for urging the release arrangement to a latched position.

In view of the above, it is a principal object of the present invention to provide a release arrangement for the battery packs of a cordless power tool having a simple yet effective construction normal in a latched condition which does not require a separately manufactured spring member.

It is a further object of the present invention to provide a release arrangement for the battery packs of a cordless power tool that has a minimum number of components and is easily operated with a single hand.

It is another object of the present invention to provide a battery pack release arrangement having components that are less subject to wear, thereby resulting in a power tool having reliability over a longer period of time.

SUMMARY OF THE INVENTION

The above and other objects are provided by a battery pack release arrangement for a cordless power tool in accordance with the preferred embodiment of the present invention. The release arrangement includes a manually operable actuation member which is movable between a latching position and a release position. In the latching position the battery packs of the cordless power tool is releasably retained within the tool housing. When the actuation member is moved to the release position, the battery packs are permitted to be quickly and easily be removed for recharging. The battery pack release arrangement of the present invention further includes a guiding member, or camming member, which functions to direct a pair of latching legs of the actuation member out of an normally interfering relation with the battery pack as the actuation member is moved to the release position.

The battery pack release arrangement of the present invention enables the battery packs to be removably retained within the housing of a cordless power tool without the need for any form of independent spring biasing member to be included in the housing. This significantly simplifies the assembly of the cordless power tool, reduces the overall complexity of the release arrangement and the cost associated with manufacturing the cordless power tool, and reduces wear typically associated with cooperating moving parts. In addition, since the downwardly extending latching legs are integrally formed with the actuation member, there are no additional manufacturing steps introduced in the manufacturing process used to produce the release arrangement.

In one form the present invention is directed to a battery pack release arrangement for a power tool having a housing and at least one battery pack releaseably mounted within the housing. The release arrangement includes an actuation member and a camming member. The actuation member is operative for releasably latching the at least one battery pack in an operative position and is moveable between a latching position and a release position. The actuation member is integrally formed to include a button portion and a latching portion adapted to be in interfering relation with the at least one battery pack when the actuation member is in the latching position. The release arrangement further includes a camming member disposed adjacent to the latching portion of the actuation member. The camming portion is adapted to resiliently deflect the latching portion out interfering relation with the at least one battery pack when the actuation member is moved from the latching position to the release position.

In a preferred embodiment, the present invention is directed to a cordless power tool including a housing and first and second generally cylindrical battery packs disposed within the housing. Each of the battery packs are formed to include a latching surface. The cordless power tool further preferably includes a release arrangement for releasably latching the battery packs in an operative position. The release arrangement includes an actuation member and a camming member. The actuation member is selectively moveable between a latching position and a release position and is unitarily formed to including first and second latching legs. The first and second latching legs similarly constructed to include distal ends adapted to be in interfering relation with the first and second battery packs, respectively, when the actuation member is in the latching position. The first and second latching legs are resiliently deflectable and formed to each include a cam follower surface. The actuation member further includes a biasing portion for biasing the actuation member to the latching position. The camming member is interconnected with the housing and includes first and second camming surfaces adapted to resiliently deflect the distal ends of the first and second latching legs, respectively, when the actuation member is in the release position.

The preferred embodiment of the present invention thus forms a uniquely simple, yet effective arrangement for releasably retaining the battery packs of a cordless power tool within the tool housing. The battery pack release arrangement of the preferred embodiment of the present invention enables one or more battery packs to be releasably retained within the tool housing without the need for the tool to have associated therewith multiple independent parts which require additional assembly steps and are subject to unnecessary wear.

BRIEF DESCRIPTION OF THE DRAWINGS

Additional objects and advantages of the present invention will become apparent to those skilled in the art from a reading of the appended claims and the following detailed description of the preferred embodiment which makes reference to the drawings of which:

DETAILED DESCRIPTION OF THE PREFERRED EMBODIMENT

The present invention provides a battery pack release arrangement for a battery pack of a cordless power tool. In the exemplary embodiment illustrated throughout the drawings, the release arrangement is shown specifically adapted for a cordless vegetation trimming apparatus. However, after reading the remainder of this detailed description, it will be immediately apparent to those skilled in the art that the present invention is not so limited in scope and is readily adaptable for use with any cordless power tool, including but not limited to hedgers, drills, impact wrenches and the like.

Figure 1:
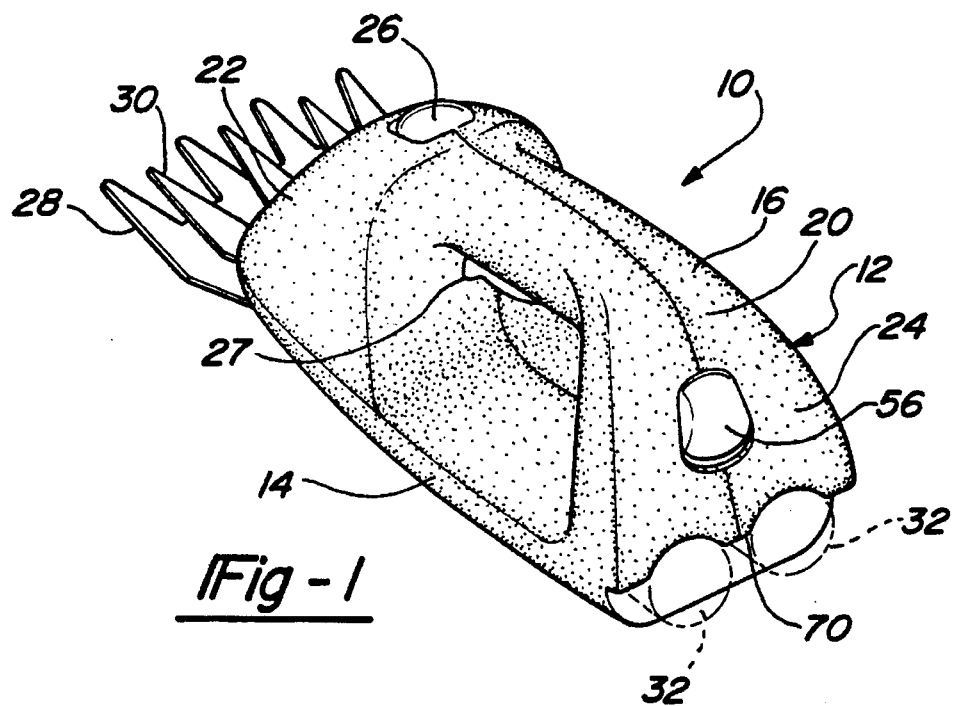
FIG. 1 is a rear perspective view of a cordless vegetation trimming apparatus incorporating a battery release arrangement constructed in accordance with the teachings of the preferred embodiment of the present invention illustrated operatively retaining a pair of battery packs.

Referring generally to FIGS. 1 though 12 in which identical or equivalent elements have been denoted with like reference numerals, an exemplary cordless power tool embodying the present invention is illustrated 1 as a cordless vegetation trimming apparatus and is identified generally at reference numeral 10.

Figure 2:
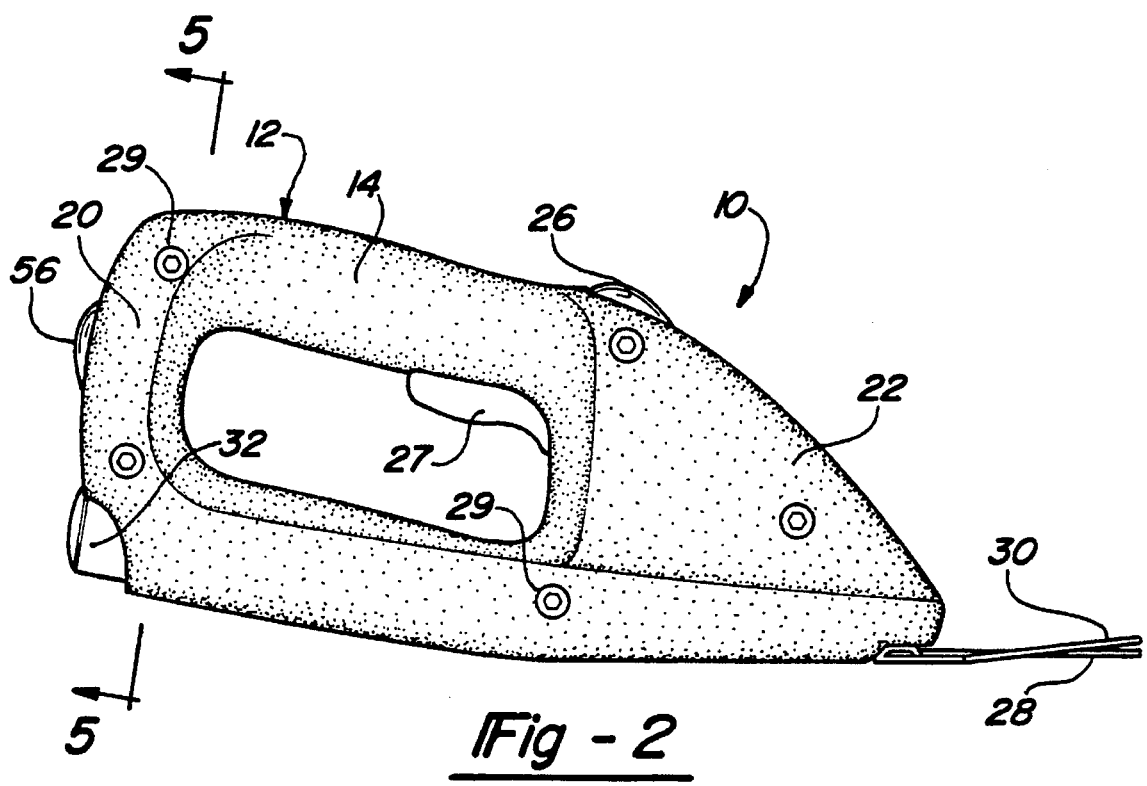
FIG. 2 is a left side view of the cordless vegetation trimming apparatus of FIG. 1.

With reference to FIGS. 1 and 2, the power tool 10 generally includes a housing 12 preferably molded of a suitable plastic material. The housing 12 includes a left hand housing portion 14 and a right hand housing portion 16 which are substantial mirror images of one another about a longitudinally extending midline defined by the intersection therebetween. The left hand and right hand housing portions 14 and 16 cooperate to define a handle portion 20, a forward portion 22 and a rear area 24. The handle portion 20 includes a dual switch arrangement having first and second user actuatable on/off triggers 26 and 27. In a conventional manner, the first on/off trigger 26 must be translated forward before the second on/off trigger 27 can be depressed for actuation of a motor (not shown) of the power tool 10. A pair of cutting members 28 and 30 are shown forwardly extending from the forward portion 22. In a conventional manner, a first of the cutting members 28 is fixedly interconnected with the housing 12 and a second of the cutting members 30 is operably attached to the housing 12 for reciprocal cutting motion with respect to the fixed cutting member 28.

Figure 3:
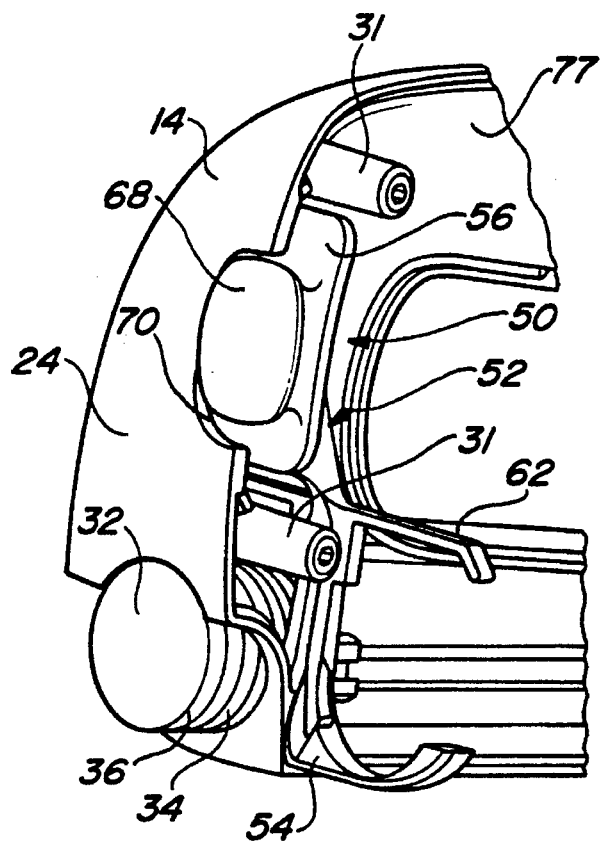
FIG. 3 is a partial rear perspective view of the cordless vegetation trimming apparatus of FIG. 1 shown with the right-half housing removed for purposes of illustrating the cooperative relationship between the tool housing, the battery release arrangement and the battery packs used to power the tool.
Figure 4:
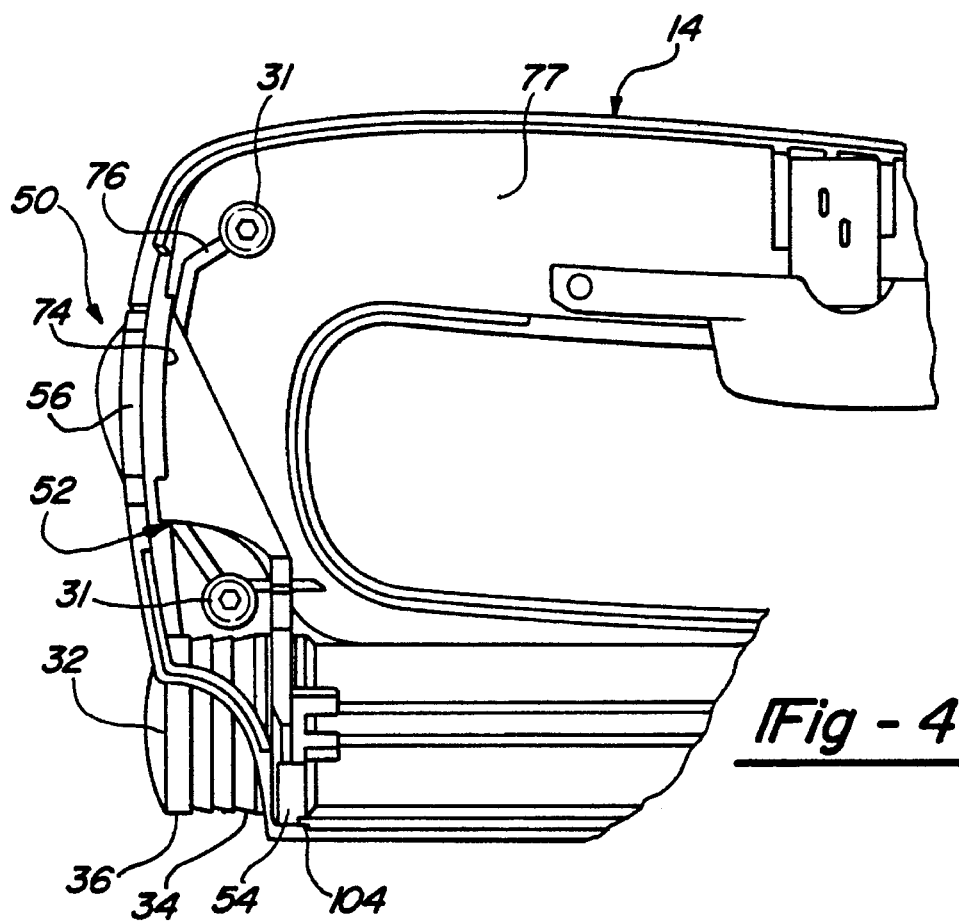
FIG. 4 is a partial side view of the cordless vegetation trimming apparatus similar to the view of FIG. 3.

With continued reference to FIGS. 1 and 2 and additional reference to FIGS. 3 and 4, the left hand housing portion and right hand housing portion 14 and 16 shown to be joined by a plurality of threaded fasteners 29. In this regard, the right hand housing portion 16 has a plurality of tubular bosses (not shown) for receiving the fasteners 29 therethrough. The left hand housing portion 14 has a corresponding plurality of elongated bosses 31. The elongated bosses include axial bores (not shown) therein for receiving the fasteners 29 which are aligned with the tubular bosses when the left hand and right hand housing portions 14 and 16 are assembled.

In the preferred embodiment of the power tool 10, a pair of battery packs 32 are releasably received in a pair of apertures formed in the rear area 24 of the housing 12 to provide electrical power to the power tool 10. It will be appreciated that each of the battery packs 32 contains a suitable battery power source which is preferably of the rechargeable type, all in a known manner. Suitable rechargeable battery packs are commercial available from the assignee of the subject application under the trademark VERSAPAK™.

With reference to FIGS. 1 through 4, each of the battery packs 32 is shown to be generally cylindrical in construction and formed to include a latching channel 34, adjacent a first or outer end 36 thereof. In use, the battery packs 32 are insertable into the housing 12 to a mounted position, illustrated in FIGS. 1 and 2. In this mounted position, a second or forward end 38 of each battery pack 32 engages electrical contacts (not shown) in the housing 12 to provide power to the motor of the power tool 10. While the subject invention has been described in connection with a cordless power tool 10 incorporating a pair of battery packs 32 of a specific construction, it will be appreciated by those skilled in the art that the teachings of the present invention may be readily adapted for releasably retaining a single battery pack 32 of cylindrical or other configuration. Analogously, the teachings of the present invention may be adapted to incorporate three or more battery packs 32.

With continued reference to FIGS. 3 and 4, in which the right-hand housing portion 16 has been removed for purposes of illustration, and additional reference to FIGS. 5 through 8, the power tool 10 is shown to include a battery pack release arrangement 50 for releasably securing the battery packs 32 to the housing 12. More specifically, the release arrangement 50 is shown to include a manually operable actuation member 52 and a guide member, or camming member 54. As will become more apparent below, the actuation member 52 is movable in a generally vertical direction between a latching position in which the battery packs 32 are securely held within the housing 12 and a release position which permits quick and easy removal of the battery packs 32 for recharging. FIGS. 3 and 4 specifically show the actuation member 52 of the release mechanism 50 in the latching position retaining one of the battery packs 32 within the housing 12.

With additional reference to FIGS. 9 and 10, the actuation member 52 of the preferred embodiment of the present invention will be described. In a preferred form the actuation member 52 is unitarily constructed, thereby alleviating unnecessary wear normally associated with cooperating moveable parts and reducing manufacturing and assembly costs. More specifically, the actuation member 52 is shown to be unitarily formed to include a manually engageable push button portion 56, a latching portion 57, a biasing portion 58, and a main body portion 59. Briefly, the biasing portion 58 preferably comprises pair of outwardly extending spring arms 62 and the latching portion 57 preferably comprises first and second downwardly extending latching legs 64. In the preferred embodiment, the actuation member 52 is formed by injection molding from a resilient plastic material. One suitable material is commercially available from DuPont Corporation as Lustran™.

Figure 5:
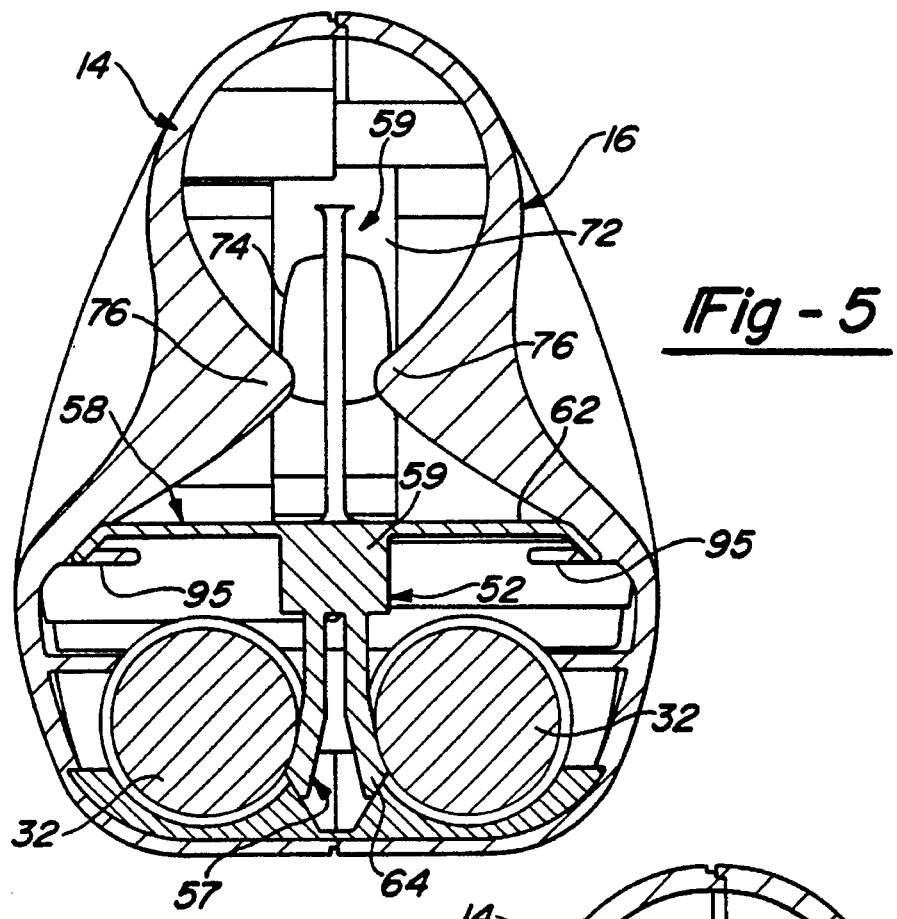
FIG. 5 is a cross-sectional view taken along the line 5—5 of FIG. 2 illustrating the actuation member of the battery release mechanism in a latching position in which a pair of outwardly extending spring arms bias the actuation member upward to a latching position and a pair of latching legs are in interfering relation with the battery packs.
Figure 6:
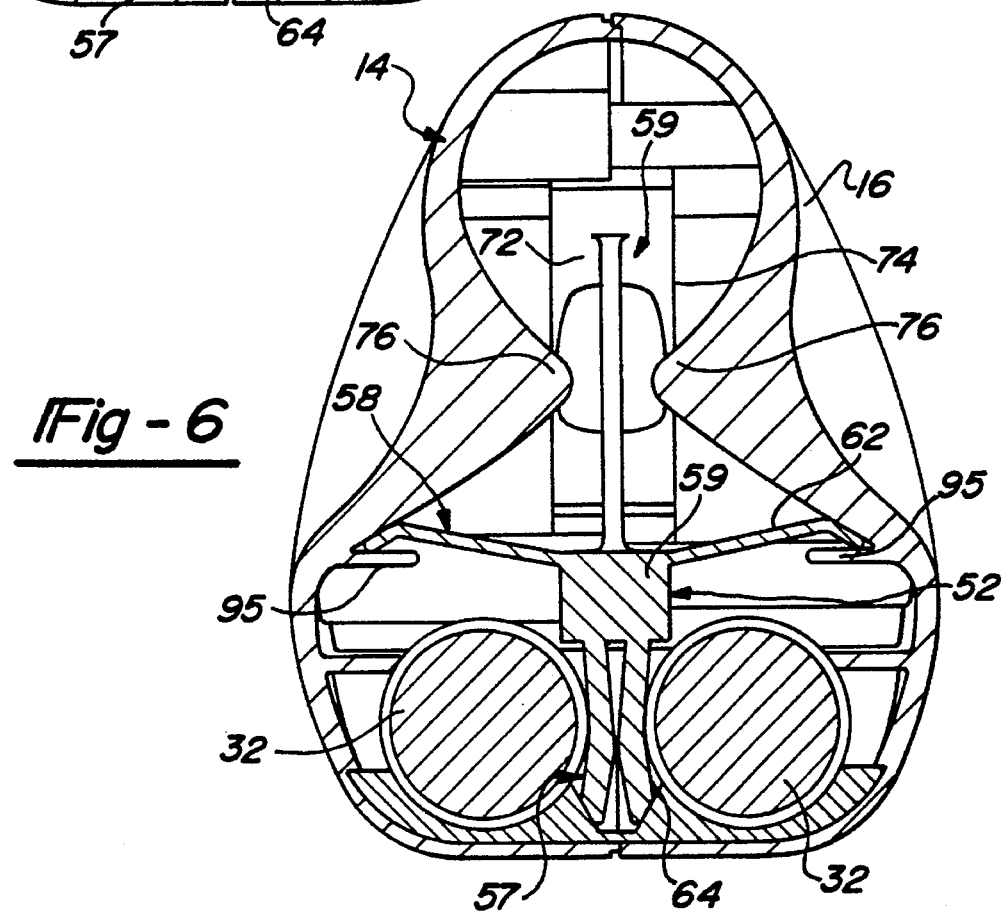
FIG. 6 is a cross-sectional view similar to FIG. 5 illustrating the actuation member of the battery release mechanism in a release position in which the biasing force of the pair of outwardly extending spring arms is overcome and the actuation member is translated downward to a release position in which the latching legs are deflected inwardly from their normal interfering relation with the battery packs.
Figure 7:
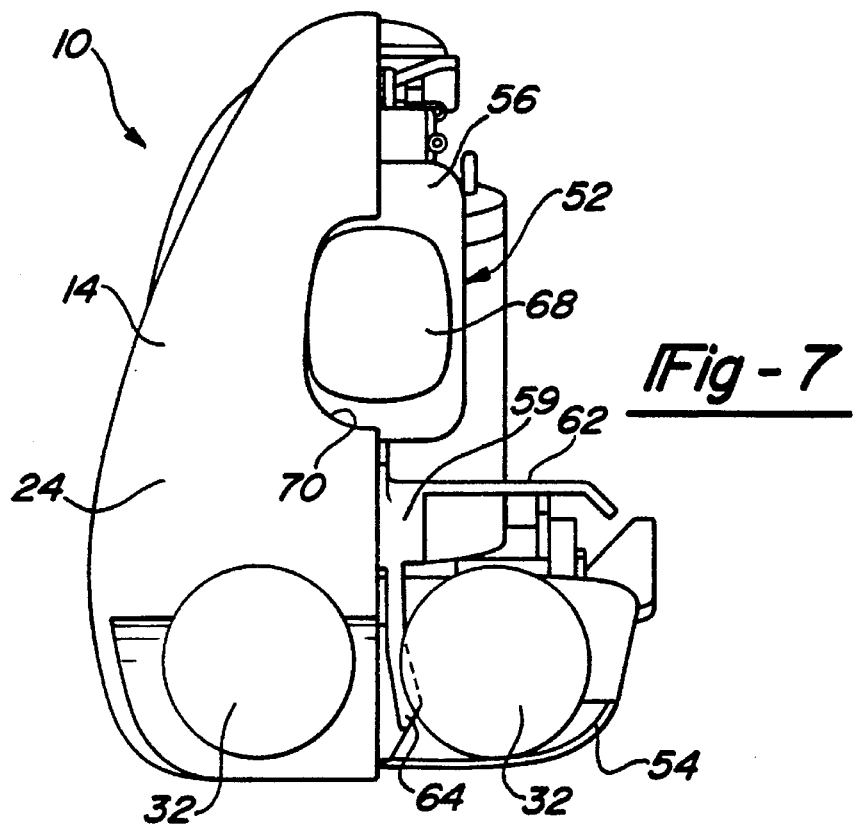
FIG. 7 is a rear view of the cordless vegetation trimming tool of FIG. 1 shown with the right halve housing removed and illustrating the actuation member of the battery release arrangement in the latching position.
Figure 9:
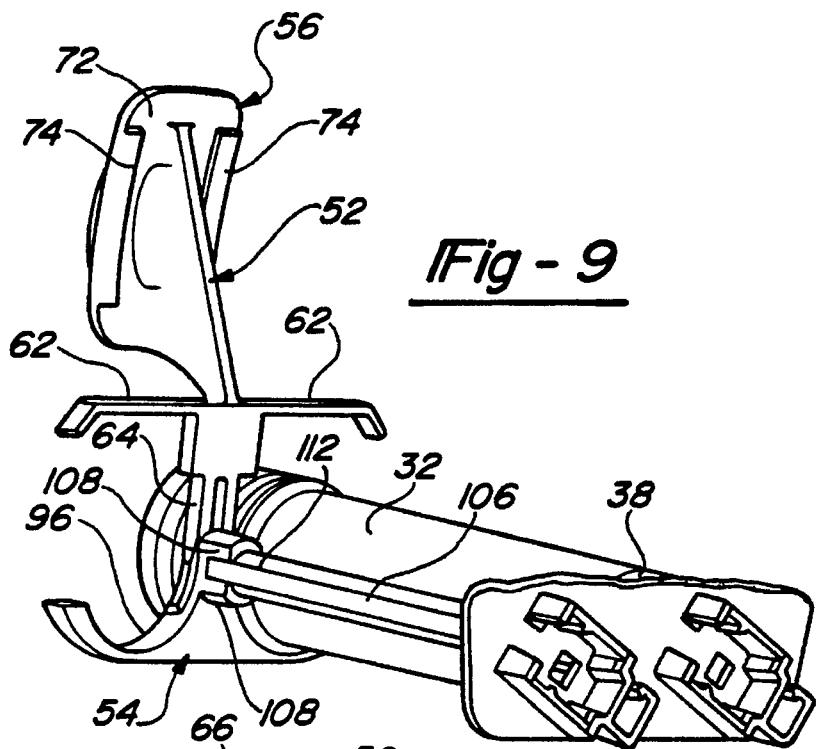
FIG. 9 is a rear perspective view of the battery release arrangement of FIG. 3 shown removed from the cordless vegetation trimming apparatus and further shown in operative cooperation with one of the battery packs.
Figure 10:
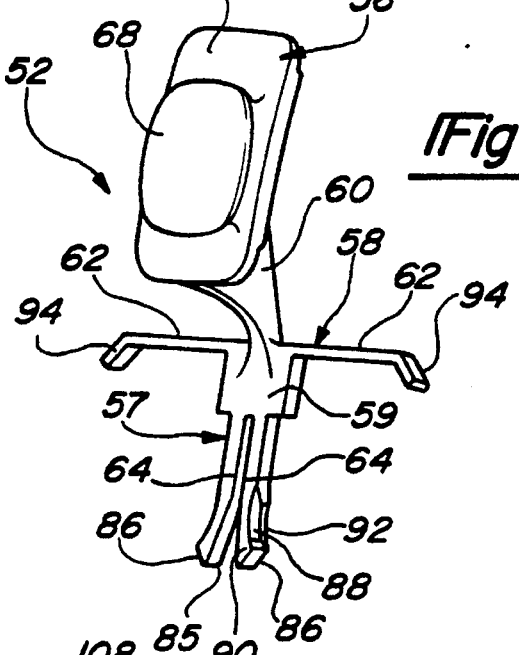
FIG. 10 is a front perspective view of the actuation member shown in FIG. 9.

With continued reference to FIGS. 9 and 10 and additional reference to the cross-sectional views of FIGS. 5 and 6, the push button portion 56 of the actuation member 52 is shown interconnected to the main body portion 59 through a neck portion 60. The push button portion 56 is further shown to include a front face 66 having a raised portion 68 arranged to extend from an aperture 70 cooperatively defined in the rear area 24 of the housing 12 by the left hand and right hand portions 14 and 16. A rear surface 72 of push button portion 56 is adapted to cooperate with the housing 12 to prevent inward translation of the push button portion 56 as force is directed thereto for moving the actuation member 52 from the latching position to the release position. In this regard, the rear surface 72 of the push button portion 56 of the actuation member 52 is formed to include a pair of spaced-apart, rearwardly extending flanges 74. The flanges 74 are each adapted to slidably contact a cooperating flange 76 formed on an inner side 77 of each of the right and left-hand housing portions 14 and 16. As shown in FIG. 4, the rear surface of the flanges 74 are slightly concavely curved.

With continued reference to FIG. 10, each of the pair of downwardly extending latching legs 64 is shown integrally interconnected with the main body portion 59 and is further shown to be generally rectangular in cross section. At their distal ends, the downwardly extending latching legs 64 diverge from one another such that a gap 85 is formed therebetween. Each of the downwardly extending latching legs 64 is adapted to engage one of the channels 34 of one of the battery packs 32. Further, each of the latching legs 64 includes a distally located cam follower surface 86. A lower portion of each of the downwardly extending engaging legs 64 is relieved such that a lead-in surface 88 is provided interbetween a front surface 90 and an outer edge surface 92.

Each of the latching legs 64 is specifically adapted to establish an interfering relation with a one of the battery packs 32 when disposed within one of the channels 34 formed adjacent the outer end 36 of the battery packs 32. As will become more apparent below, the latching legs 64 are adapted to inward deflect toward one another as the actuation member 52 is moved from the latching position to the release position. The natural resiliency of the latching legs 64 maintains the latching legs 64 in normally interfering relation with the battery packs 32.

With continued reference to FIG. 10 and additional reference to FIGS. 5 and 6, the construction of the spring arms 62 actuation member 52 and cooperating portions of the housing 12 will now be described. Each of the spring arms 62 is integrally formed with the actuation member 52 and is shown to include a downwardly angled tip portion 94. The tip portions 94 are adapted to be in constant biasing engagement with a pair of cooperating flange portions 95 which inwardly extend from an inner surface of the housing 12. This state of normal compression and the natural resiliency of the actuation member 52 provide an inherent biasing force which urges the actuation member 52 upward to its latching position.

Figure 11:
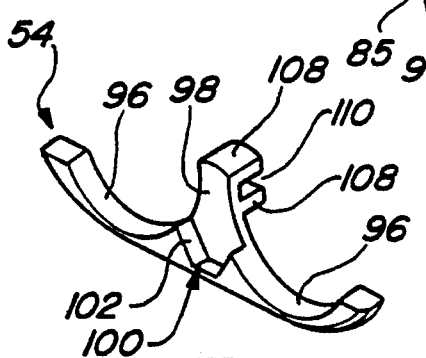
FIG. 11 is a front perspective view of the camming member shown in FIG. 9.
Figure 12:
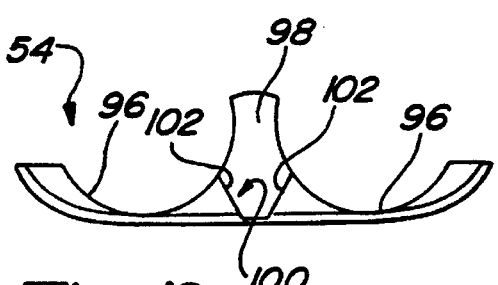
FIG. 12 is a front view of the camming member.

With reference to FIGS. 11 and 12, the camming member 54 of the present invention is shown in greater detail. The camming member 54 is shown to include a pair of arcuate portions 96 adapted to receive the battery packs 32 and thereby locate the battery packs 32 relative to the actuation member 52 of the battery release arrangement 50. In the preferred embodiment, the arcuate portions 96 are interconnected by an upwardly extending central portion 98. A forward area of the central portion 98 is cut-away to partially define a downwardly tapering, V-shaped channel 100. In this regard, the downwardly tapering channel 100 is partially defined by a pair of side walls or camming surfaces 102. As will become more apparent below, the camming surfaces 102 cooperate with the follower surfaces 86 of the downwardly extending latching legs 64 of the actuation member 52 to resiliently flex the latching legs 64 inwardly as the actuation member is moved from its latching position to its release position.

The camming member 54 is disposed within a transversely extending channel 104 (shown in FIG. 4) cooperatively defined by the left and right hand housing portions 14 and 16. While the camming member 54 of the present invention is shown as an independent component, it will be appreciated by those skilled in the art that alternatively the camming member 54 may be formed as part of the housing 12. In this regard, the camming member 54 may be cooperatively formed by the left and right hand housing portions 14 and 16 of the tool housing 12.

With reference to FIGS. 9 and 11, the rear surface 72 of the push button portion 56 is further shown to be configured for receiving a stabilizing post 106. Specifically, the rear surface 72 includes a pair of rearwardly extending portions 108 which cooperate to partially define a cavity 110. The cavity 110 releasably receives a first end 112 of the support post 106.

Figure 8:
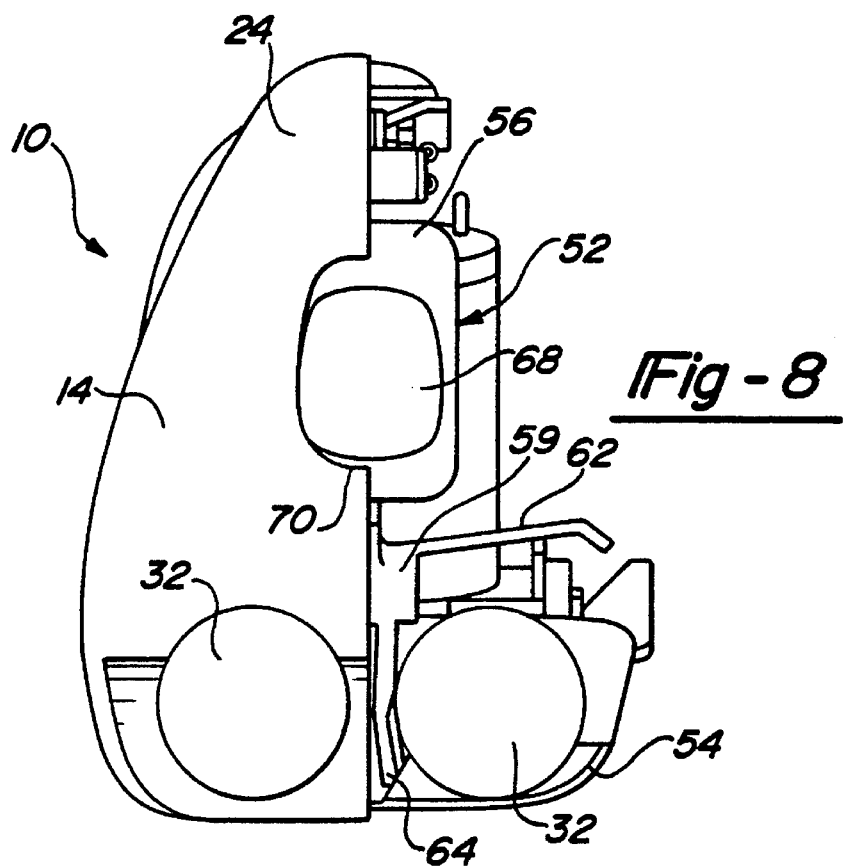
FIG. 8 is a rear view of the cordless vegetation trimming tool similar to the view of FIG. 7, illustrating the actuation member of the battery release arrangement in the release position.

Referring now to FIGS. 3 through 8, the operation of the release arrangement 50 of the present invention will be described. In FIGS. 3 through 5 and 7, the actuation member 52 is shown in its latching position. In FIGS. 6 and 8, the latching member is shown displaced downwardly to its release position.

In operation, when it is desired to mount the battery packs 32 in place within the power tool 10, the forward end 38 of each of the battery packs 32 is inserted into the corresponding aperture in the housing 12. The forwards end 38 of the battery packs 32 cooperate with the lead-in surfaces 88 of the latching legs 64 to inwardly deflect the latching legs 64, thereby permitting the battery packs 32 to advance to their mounted operating positions. As the battery packs 32 reach their mounted positions, the latching legs 64 resiliently snap back to their latching positions, into latching engagement with the corresponding channels 34 of the battery packs 32 to securely latch the battery packs 32 in place.

When it is desired to remove the battery packs 32 from their operatively mounted position within the tool housing 12, such as for recharging of the battery, the handle portion 20 of the power tool 10 is grasped by the user while the power tool 10 is rotated 180° from a cutting position (i.e., with the front end portion 22 of the power tool 10 adjacent the user). More specifically, the palm of the user'hand is placed upon the top of the handle portion 20 and the user'fingers are wrapped about the handle portion 20. The hand is positioned adjacent the rear area 24 of the housing 12 and the thumb is extended until it contacts the push button portion 56 of the actuation member 52. A force is then imparted by the user on the push button portion 56 in a generally downward direction. This force serves to overcome the biasing force of the pair of spring arms 62 and move the actuation member 52 from its latching position (e.g., as shown in FIG. 5) to its releasable position (e.g., as shown in FIG. 6).

As the actuation member 52 is urged downwardly toward the release position, the cam follower surfaces 86 of the downwardly extending latching legs 64 slidably contact the corresponding camming surfaces 102 of the camming member 54, thereby causing each of the latching legs 64 to resiliently flex inwardly toward one another. As a result, the actuation member 52, in general, and the latching legs 64 in particular, are displaced from their normally interfering relation with the battery packs 32. Thus, the battery packs 32 are freely permitted to be removed from the tool housing 12 for recharging. In this regard, the battery packs 32 can be manually extracted or the cordless power tool 10 can be inverted so that gravity causes the battery packs 32 to fall from the tool housing 12.

While the above description constitutes the preferred embodiment of the invention, it will be appreciated that the invention is susceptible to modification, variation, and change without departing from the proper scope or fair meaning of the present invention. For example, in addition to cordless power tools, the battery release arrangement 50 of the subject invention can be readily modified for incorporation into a battery recharger.

We claim:

1. A battery pack release arrangement for a power tool having a housing and at least one battery pack releaseably mounted within the housing, the release arrangement comprising:

an actuation member for releasably latching the at least one battery pack in an operative position, said actuation member being moveable between a latching position and a release position, said actuation member integrally formed to include a button portion and a latching portion, said latching portion adapted to be in interfering relation with the at least one battery pack when said actuation member is in said latching position; and a camming portion disposed adjacent to said latching portion of said actuation member, said camming portion adapted to resiliently deflect said engaging portion out interfering relation with the at least one battery pack when said actuation member is moved from said latching position to said release position.

2. The release arrangement of claim 1, wherein said actuation member further includes a biasing portion for biasing said actuation member to said latching position.

3. The release arrangement of claim 2, wherein said actuation member is unitarily constructed to include said button portion, said latching portion and said biasing portion.

4. The release arrangement of claim 3, wherein the latching portion includes at least one resiliently deflectable latching leg normally in interfering relation with the at least one battery pack.

5. The release arrangement of claim 4, wherein the actuation member is adapted for releasably latching first and second batteries of the power tool within the housing.

6. The release arrangement of claim 5, wherein said at least one resiliently deflectable latching leg comprises first and second resiliently deflectable latching legs, said first and second deflectable latching legs adapted to be in interfering relation with said first and second batteries, respectively, when said actuation member is in said latching position.

7. The release arrangement of claim 6, wherein said first and second deflectable latching legs are interdisposed between said first and second battery packs of the power tool, and further wherein said first and second deflectable latching legs are adapted to inwardly deflect when said actuation member is moved from said latching position to said release position, thereby permitting removal of said first and second battery packs from the housing.

8. A battery pack release arrangement for a power tool of the type having first and second battery packs removably mounted in a housing, the release arrangement comprising:

a latching surface formed on each of the battery packs;

an actuation member for releasably latching the battery packs in an operative position, said actuation member being moveable between a latching position and a release position, said actuation member including a button portion partially extending from an aperture in the housing and a latching portion for engaging said latching surfaces of each of the battery packs when said actuation member is in said latching position; and a camming portion attached to the housing for resiliently deflecting said latching portion out of engagement with the battery packs when said actuation member is moved from said latching position to said release position, thereby permitting removal of the battery packs from the housing.

9. The release arrangement of claim 8, wherein said actuation member further includes a biasing portion for biasing said actuation member to said latching position.

10. The release arrangement of claim 9, wherein said actuation member is unitarily constructed to include said button portion, said latching portion and said biasing portion.

11. The release arrangement of claim 10, wherein said latching portion includes first and second latching legs normally in interfering relation with the first and second battery packs, respectively.

12. The release arrangement of claim 11, wherein said first and second latching legs are interdisposed between the first and second battery packs and further wherein said first and second latching legs are adapted to be resiliently deflected inwardly toward one another as said actuation member is moved from said latching position to said release position, thereby moving said first and second latching legs out of interfering relation with the first and second battery packs, respectively.

13. The release arrangement of claim 12, wherein said camming portion includes first and second camming surfaces which cooperate to partially define a V-shaped channel.

14. The release arrangement of claim 13, wherein the first and second latching legs respectively include first and second distally located cam follower surfaces adapted to engage said first and second camming surfaces of said camming portion, respectively.

15. A cordless power tool comprising:

a housing;

first and second generally cylindrical battery packs disposed within said housing, each of said battery packs including a latching surface formed thereon; and a release arrangement for releasably latching said battery packs in an operative position, said release arrangement including:

an actuation member moveable between a latching position and a release position, said actuation member unitarily formed to including a first and second latching legs having distal ends and adapted to be in interfering relation with the first and second battery packs, respectively, when said actuation member is in said latching position, said first and second latching legs being resiliently deflectable and each including a distal end having a cam follower surface, said actuation member further including a biasing portion for biasing said actuation member to said latching position; and a camming member including first and second camming surfaces interconnected with said housing, said first and second camming surfaces adapted to engage said first and second cam follower surfaces, respectively, and resiliently deflect said first and second latching legs, respectively, when said actuation member is in said release position.

16. The cordless power tool of claim 15, wherein said biasing portion of said actuation member includes first and second resiliently deflectable spring arms adapted to engage said housing.

17. The cordless power tool of claim 16, wherein said first and second latching legs are interdisposed between said first and second battery packs such that said distal ends of said latching legs are adapted to inwardly deflect when said actuation member is moved from said latching position to said release position.

18. The cordless power tool of claim 17, wherein said first and second camming surfaces cooperate to partially define a V-shaped channel in said camming member.

* * * * *

UNITED STATES PATENT AND TRADEMARK OFFICE
CERTIFICATE OF CORRECTION

PATENT NO.   :   5,589,288
DATED        :   December 31, 1996
INVENTOR(S)  :   Richard R. Coulson et al.

It is certified that error appears in the above-indentified patent and that said Letters Patent is hereby corrected as shown below:

On the Title Page, in the "Abstract", line 8,
"Preferrably" should be --Preferably--.

On the Title Page, in the "Abstract", line 16,
"an" should be --a--.

On the Title Page, in the "Abstract", line 19,
"surface" should be --surfaces--.

Column 8, line 39, claim 1,
after "out", insert --of--.

Column 10, line 15, claim 15,
"including" should be --include--.

Signed and Sealed this

Twenty-sixth Day of August, 1997

Attest:

BRUCE LEHMAN

Attesting Officer      Commissioner of Patents and Trademarks